(12) United States Patent
Summitt

(10) Patent No.: US 7,769,777 B2
(45) Date of Patent: Aug. 3, 2010

(54) APPARATUS AND METHOD FOR IDENTIFYING UNKNOWN WORD BASED ON A DEFINITION

(76) Inventor: Eric Summitt, 1306 Harvey Rd., Knoxville, TN (US) 37922

(*) Notice: Subject to any disclaimer, the term of this patent is extended or adjusted under 35 U.S.C. 154(b) by 578 days.

(21) Appl. No.: 11/693,190

(22) Filed: Mar. 29, 2007

(65) Prior Publication Data

US 2008/0243486 A1 Oct. 2, 2008

(51) Int. Cl.
  *G06F 17/30* (2006.01)
(52) U.S. Cl. ....................................................... 707/780
(58) Field of Classification Search ........................ None
  See application file for complete search history.

(56) References Cited

U.S. PATENT DOCUMENTS

| | | | |
|---|---|---|---|
| 5,649,221 A | 7/1997 | Crawford et al. | |
| 5,893,717 A * | 4/1999 | Kirsch et al. | 434/118 |
| 6,529,705 B1 * | 3/2003 | Keller et al. | 434/362 |
| 2005/0209903 A1 * | 9/2005 | Hunter et al. | 705/9 |
| 2006/0160594 A1 * | 7/2006 | Brase | 463/9 |

* cited by examiner

*Primary Examiner*—Neveen Abel Jalil
*Assistant Examiner*—Bai D Vu
(74) *Attorney, Agent, or Firm*—Pitts & Brittian, P.C.

(57) ABSTRACT

An apparatus and method of identifying an unknown word based on a known meaning, or word identification system. The word identification system allows a user that knows the meaning of a word but cannot recall the word that corresponds to the known meaning to identify the word through a series of simple questions. Each of the questions elicits information known about the unknown word through the knowledge of the meaning of the word and its use in language. With each response, the number of words matching the definitional characteristics is reduced until a set of one or more probable words and definitions for the unknown word is finally presented to the user.

4 Claims, 3 Drawing Sheets

APPARATUS AND METHOD FOR IDENTIFYING UNKNOWN WORD BASED ON A DEFINITION

CROSS-REFERENCE TO RELATED APPLICATIONS

Not Applicable

STATEMENT REGARDING FEDERALLY-SPONSORED RESEARCH OR DEVELOPMENT

Not Applicable

BACKGROUND OF THE INVENTION

1. Field of Invention

The invention relates to a language tool that provides the word that corresponds to a definition.

2. Description of the Related Art

The complexity of languages creates unique challenges when trying to describe concepts. One complication that frequently occurs during a writing assignment is the inability to recall a word that describes the meaning the author is trying to convey. It is also likely that an author may be sure that there is a word to describe a concept but is unfamiliar with the term. Regardless of whether the word was forgotten or unknown, the end result is the same. The inability to find the desired word results in the author having to resort to the use of another word, which may have a similar meaning but lack the desired connotation, or having to rephrase the passage to obviate the need to use the unrecalled word, which may interrupt the flow or change the comprehension level of the passage.

Prior art solutions to the problem of identifying an unknown word include books such as the reverse dictionary and the thesaurus. Both are useful tools but are limited in there usefulness due to their non-interactive nature. With a thesaurus, the user looks for a word that shares a similar meaning with the word being sought. The thesaurus provides a list of synonyms or antonyms for the user to consider. Thus, use of a thesaurus presumes that the user can identify a word that will lead to the discovery of the unknown word.

With a reverse dictionary, the user is afforded a more general starting point. The user starts with a clue that relates to the word being sought. Instead of being limited to synonyms and antonyms, the reverse dictionary clue words are familiar words that have been selected to guide the user to related concepts. For example, starting with a clue word like "football" might lead a user to related concepts such as terminology for equipment, part of the field, player positions, or activities occurring in a football game. While this approach is certainly broader than the thesaurus concept, it does not direct the user to a specific word being sought. The quality of a reverse dictionary search relies heavily on the ease and quality of the clue words selected by the searcher.

In addition to the general prior art discussed above, U.S. Patent Application Publication 2006/10160594A1, filed by Kevin Brase and published on Jul. 20, 2006, discloses an interactive deduction game. The interactive deduction game asks a limited number of questions having yes/no/maybe/sometimes answers to attempt to identify an object.

U.S. Pat. No. 5,649,221 issued to H. Vance Crawford, et al., on Jul. 15, 1997, describes a reverse electronic dictionary using synonyms to expand search capabilities. The '221 patent describes a reverse electronic dictionary where a thesaurus is cross-referenced to dictionary entries by numeric codes to provide greater flexibility when performing searches of the reverse electronic dictionary.

There is a need for a device that provides a more directed approach to locating an unknown or forgotten word based on knowledge of the meaning of the word. A directed approach would obtain many relevant clue words, ranging from general to specific, for use in the search rather than relying on selection of a single useful clue word as is typical when using a thesaurus or a reverse dictionary.

BRIEF SUMMARY OF THE INVENTION

An apparatus and method of identifying an unknown word based on a known meaning, or word identification system, is described herein and illustrated in the accompanying figures. The word identification system allows a user that knows the meaning of a word but cannot recall the word that corresponds to the known meaning to identify the word through a series of simple questions. Each of the questions elicits information known about the unknown word through the knowledge of the meaning of the word and its use in language. With each response, the number of words matching the definitional characteristics is reduced until a set of one or more probable words and definitions for the unknown word is finally presented to the user.

The word identification system includes a query-engine, a resource library, a comparison library, a response store, and one or more user interfaces a, b, c. The query engine is a processor or controller that presents queries to a user and receives user input in response to the queries via the user-interface. The query engine controls program flow based on the user input and determinations made in response to the user input.

The resource library, the comparison library, and the response store all generally comprise memory devices for storing information used by the query engine or received from a user input. The resource library stores questions, responses, definitional characteristics associated with the responses, and branching information for use by the query engine. The comparison library contains the words being sought as well as the associated definition and definitional characteristics. The response store keeps a record of the questions, the response options associated with each of the questions, the response received from the user for each of the questions, and additional information such as the order of the questions and responses, as necessary. The user interface provides the input and output devices necessary for the user to interact with the word identification system, such as a display and an input device.

The components of the word identification system have been selected to allow the word identification system to be implemented in a self-contained and independent device for local, individual use or distributed across a network to allow remote access and usage by one or more users simultaneously.

The word identification system stores a plurality of sets of probable words. The probable word sets include one more words having a common set of definitional characteristics and the definition associated with each word. The set of definitional characteristics corresponding to each probable word set is referred to herein as the set of word-set definitional characteristics.

In operation, the word identification system presents a linguistic question with a number of response options having general applicability to words. When the user makes a selection, the definitional characteristic associated with the response becomes part of a set of definitional characteristics that lead to the identification of the unknown word. This set is referred to herein as the set of response definitional characteristics. Until the set of response definitional characteristics and the set of word-set definitional characteristics correspond, the word identification system continues to present additional questions and response options to elicit additional definitional characteristics. These subsequent questions, response options, and associated definitional characteristics of the subsequent questions are based on the previous response and generally refine a previous definitional characteristic or present an unrelated definitional characteristic.

When the set of response definitional characteristics and the set of word-set definitional characteristics for a particular set of probable words correspond, the word identification system presents the set of probable words on the display unit. Assuming that the unknown word is part of the data libraries stores in the memory device and/or the responses to the questions were accurate, the unknown word is identified.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An apparatus and method of identifying an unknown word based on a known meaning, or word identification system, is generally labeled 100 as described herein and illustrated in the accompanying figures. The word identification system allows a user that knows the meaning of a word but cannot recall the word that corresponds to the known meaning to identify the word through a series of simple questions. Each of the questions elicits information known about the unknown word through the knowledge of the meaning of the word and its use in language. With each response, the number of words matching the definitional characteristics is reduced until a set of one or more probable words and definitions for the unknown word is finally presented to the user.

At the outset, it should be noted that the terminology unknown word represents words that are actually unknown to the user and words that are known but have been temporarily forgotten by the user. The word identification system 100 is therefore usable as a memory aid or a learning tool to broaden vocabulary.

Figure 1:
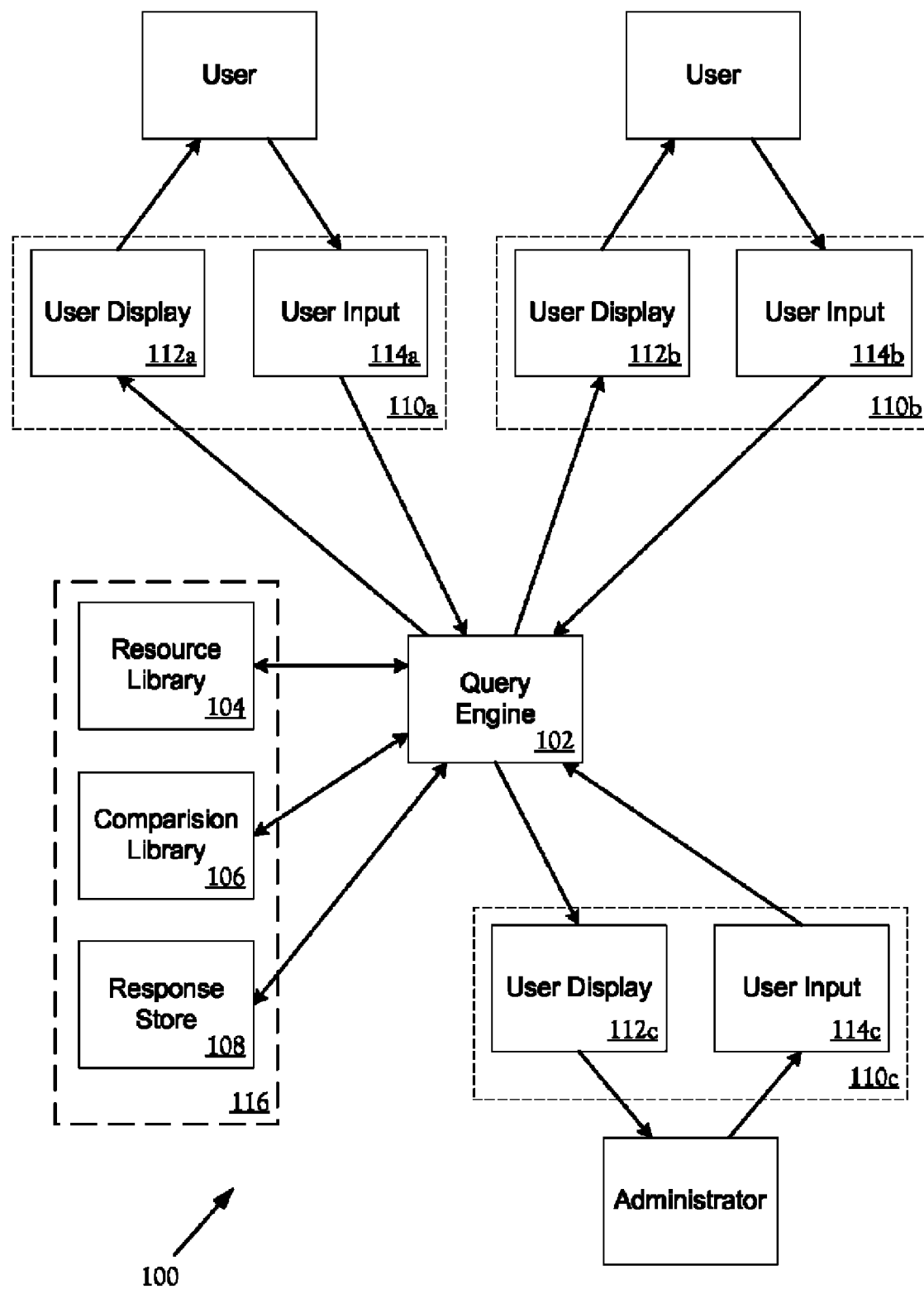
FIG. 1 illustrates one embodiment of the apparatus for the word identification system.

FIG. 1 illustrates one embodiment of a structure of the word identification system 100. The word identification system includes a query-engine 102, a resource library 104, a comparison library 106, a response store 108, and one or more user interfaces 110*a*, 110*b*, 110*c*. The query engine 102 is a processor or controller that presents queries to a user and receives user input in response to the queries via the user-interface. The query engine 102 controls program flow based on the user input and determinations made in response to the user input.

The resource library 104, the comparison library 106, and the response store 108 all generally comprise one or more memory devices 116 for storing information used by the query engine or received from a user input. The resource library 104 stores questions, responses, definitional characteristics associated with the responses, and branching information for use by the query engine 102. The comparison library 106 contains the words being sought as well as the associated definition and definitional characteristics. The response store 108 keeps a record of the questions, the response options associated with each of the questions, the response received from the user for each of the questions, and additional information such as the order of the questions and responses, as necessary. The user interface provides the input and output devices necessary for the user to interact with the word identification system. In the illustrated embodiment, the user interfaces include a display 112*a*, 112*b*, 112*c* and an input device 114*a*, 114*b*, 114*c*; however, those skilled in the art will recognize the suitability and availability of alternate user interface mechanisms including audible presentation and voice recognition.

The components of the word identification system 100 have been selected to allow the word identification system 100 to be implemented in a self-contained and independent device for local, individual use or distributed across a network to allow remote access and usage by one or more users simultaneously. Further, the word identification system 100 is alternatively implemented as a stand-alone application or as an add-in to another application, such as a word processor. Examples of suitable hardware for local use of the word identification system 100 include personal digital assistants (PDAs), digital media players, smartphones, personal computers, laptops. This type of hardware includes the necessary processor to run the query engine software, memory for the storage of the resource library, the comparison library, and the response store, a human interface device such as a mouse, keyboard, keypad, or touch screen serving as an input device to allow data entry, and a display. Alternatively, in a remote implementation, the word identification system 100 operates on the same type of hardware described above but the hardware serves primarily as a terminal. Server hardware at remote location is responsible for the processing and data storage required by the word identification system 100. The server hardware transmits the information to the terminal hardware for display and receives inputs from the terminal hardware via network connections. It should be appreciated that the query engine and the various libraries and storage may be located on separate hardware without departing from the scope and spirit of the present invention.

Figure 2:
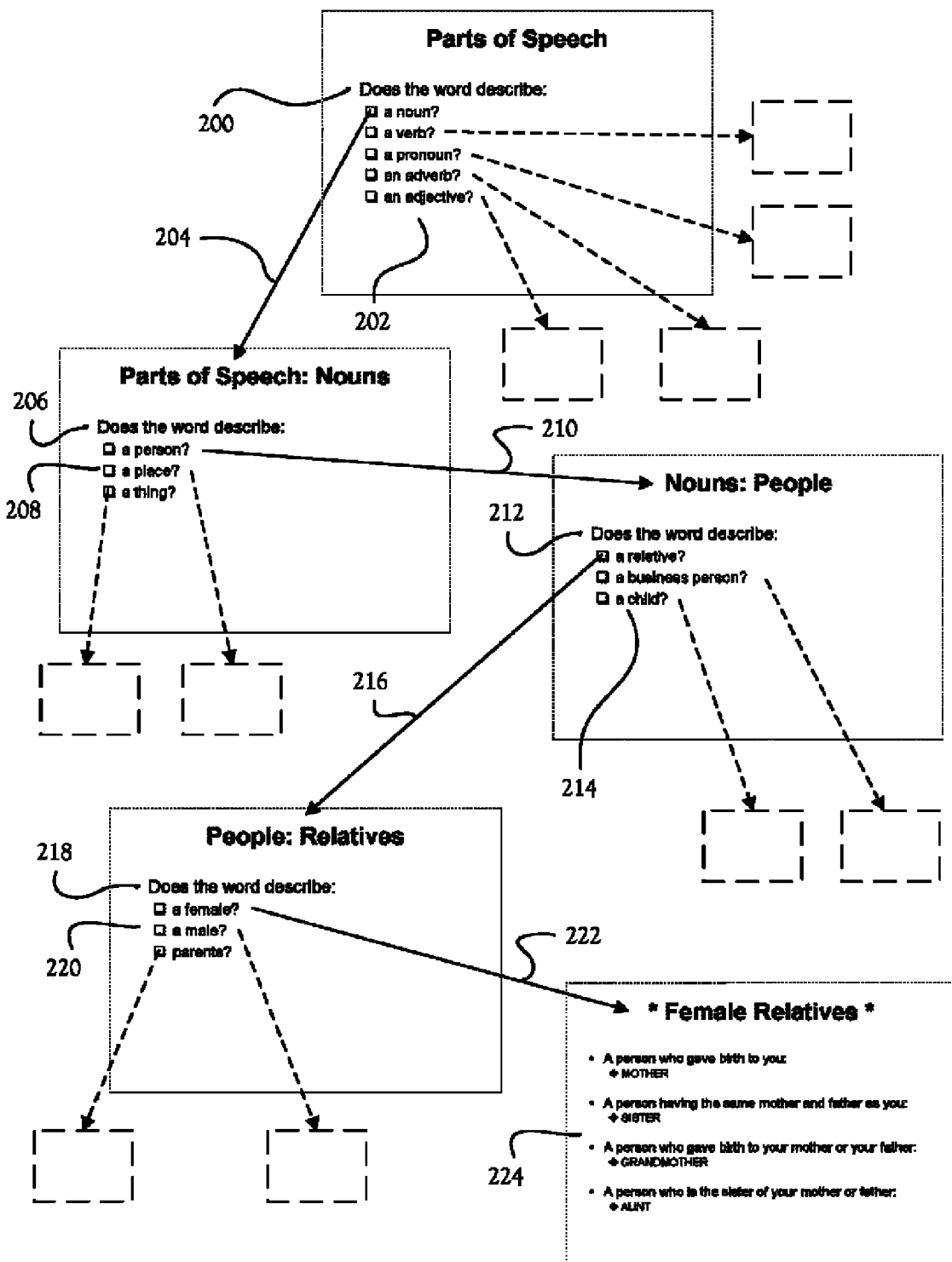
FIG. 2 is a flowchart of one embodiment of a method of operation of the word identification system of FIG. 1.

FIG. 2 illustrates an example of one embodiment of the operation of the word identification system 100. The query engine 102 begins by asking general classification questions that direct the user to more specific questions. In the illustrated embodiment, the query engine begins with a question 200 asking the user to identify the part of speech of the word being sought and presents a limited set of response options 202 from which the user can select. When the user makes a selection, the query engine retrieves a new question and a new set of responses from the resource library that correspond to the previous selection. As illustrated, the user identifies the part of speech as a noun 204 and the query engine retrieves a follow-up question 206 and set of response options 208 that ask the user to identify the type of noun of the word being sought. When the user identifies 210 the type of noun as person, the query engine again retrieves a new question and set of responses for consideration by the user. This process of presenting the user with a question and set of responses continues until sufficient information is obtained to present the user with one or more words that are likely to include the word being sought and the definitional characteristics associated with the each response is stored.

Continuing the illustrated example, the next question 212 and response options 214 address the type of person. Specifically, the question 212 attempts to elicit information that categorizes by age, occupation, or familial relationship. After responding 216 the word being sought pertains to a relative, the user continues through an additional question 218 and set of response options 220 identifying the word being sought as pertaining to a relative, and a female. With the response 222 that the word being sought pertains to a female, the query engine has elicited sufficient information to present the user with a list 224 of definitions and associated words that are probable matches for an unknown word having the definitional characteristics of noun, person, relative, and female.

The response options 212 for the type of person illustrate another concept not found in a standard reverse dictionary or thesaurus. Obviously, if the user identifies the word being sought as pertaining to a child, one potential follow-up question would ask whether the child is a relative. Similarly, if the word being sought as pertains to a relative, the follow-up questions are likely to ask whether the relative is a child or an adult. Although this approach can result in some duplication of effort and may not lead to suggestions for the word being sought in the absolute fewest number of questions, it does offer alternate paths to arrive at the same set of suggestions for the word being sought. Because different users are likely to focus on different definitional characteristics of the word being sought at different stages in the discovery process, the alternate paths accommodate different thought processes to find the word being sought.

Figure 3:
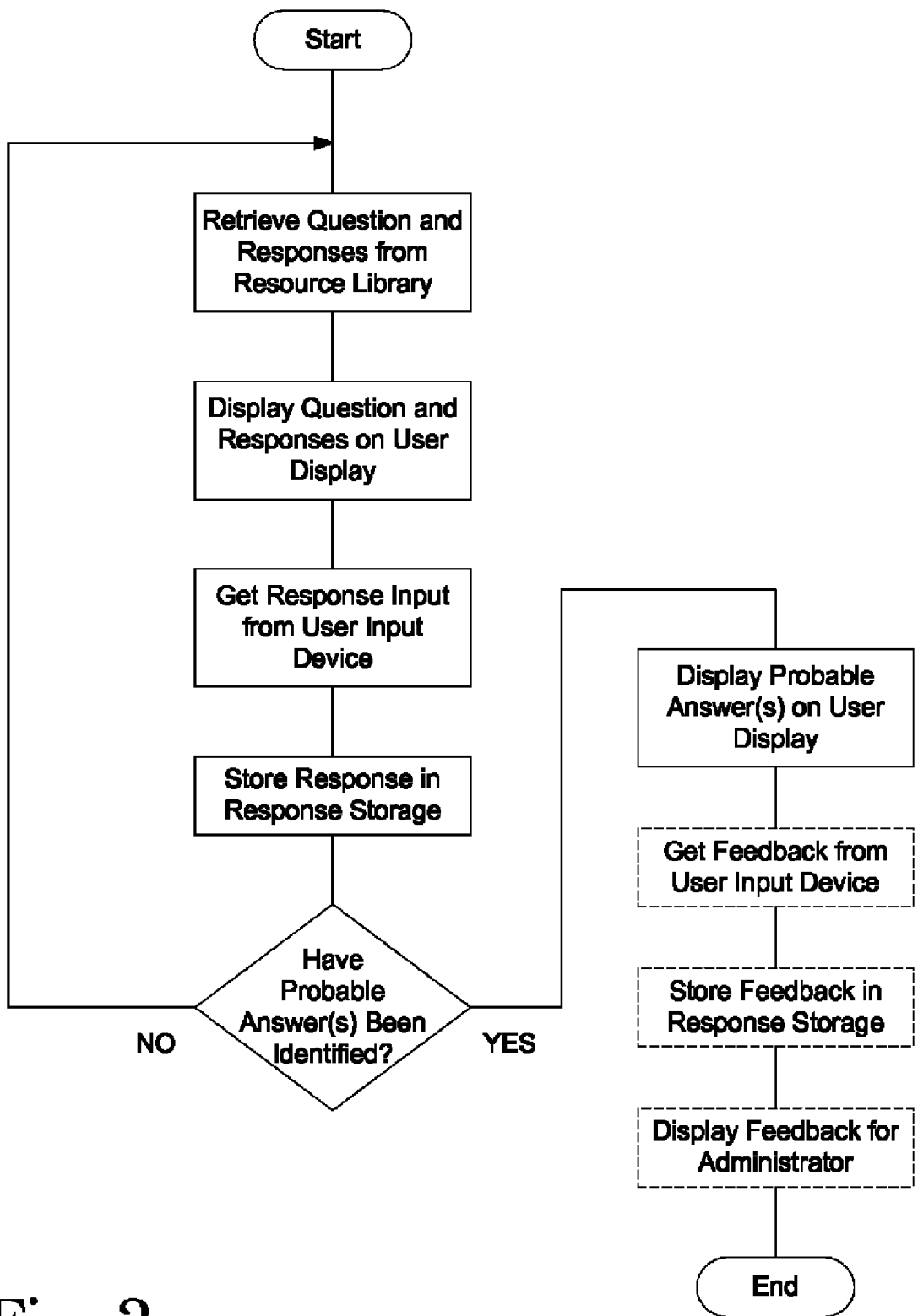
FIG. 3 is a flowchart of an exemplary word identification session illustrating the flow of a series of questions and responses to conclusion with a list of probable words according to the method of FIG. 2.

FIG. 3 illustrates one embodiment of the method of identifying an unknown word using the apparatus of FIG. 1 to produce a series of branching questions leading to one or more probable words which allow identification of the unknown word. The word identification system 100 includes a plurality of sets of probable words. The probable word sets include one more words having a common set of definitional characteristics and the definition associated with each word. The set of definitional characteristics corresponding to each probable word set is referred to herein as the set of word-set definitional characteristics. As the number of definitional characteristics associated with each word set increases, the number of words that are grouped together is generally reduced and the number of questions required to resolve the unknown word generally increases. In one embodiment, the branching algorithm is implemented is a series of direct links such as hypertext links between data pages. Another embodiment associates unique identifies with the various data elements and the query engine retrieves the next question in the branch and the associated data elements using the unique identifies rather than requiring static links.

Initially, the word identification system 100 presents a linguistic question with a number of response options having general applicability to words. Typically, the initial question will pertain to the part of speech to which the unknown word belongs. Each of the response options has a corresponding definitional characteristic. The question and response options are displayed on a display unit. When the user makes a selection via the input device, the definitional characteristic becomes part of a set of definitional characteristics that lead to the identification of the unknown word. This set is referred to herein as the set of response definitional characteristics. Until the set of response definitional characteristics and the set of word-set definitional characteristics correspond, the word identification system 100 continues to present additional questions and response options to elicit additional definitional characteristics. These subsequent questions, response options, and associated definitional characteristics of the subsequent questions are based on the previous response and generally refine a previous definitional characteristic or present an unrelated definitional characteristic.

When the set of response definitional characteristics and the set of word-set definitional characteristics for a particular set of probable words correspond, the word identification system 100 presents the set of probable words on the display unit. Assuming that the unknown word is part of the data libraries stores in the memory device and/or the responses to the questions were accurate, the unknown word is identified. As previously mentioned, the size of the list of probable words generally varies with the number of associated definitional characteristics used in the analysis. The number of associated definitional characteristics used is selectable for limiting the number of possible choices to a reasonable number. In one embodiment, the group of response definitional characteristics is established by the branching algorithm and the links between the responses and questions.

In another embodiment, the word identification system 100 stores the definitional characteristics associated with each selected response and filters the sets of probable words as each new definitional characteristic is added. When the query engine receives a set of probable words that is deemed to be reasonable number in response to a definitional characteristic filter, the returned set of probable words is presented on the display. The number which is determined to be reasonable is initially set by the administrator. In some embodiments, the user is able to change the reasonable number via the input device to broaden or narrow the search.

Optionally, other information such the selected responses, the unselected response options, the questions presented, and the order of presentation is stored for later in the response store for analysis. In some embodiments, this additional information is used as part of the filter to exclude words matching definitional characteristics not selected.

In one embodiment, the word identification system 100 uses the stored information in a predictive manner to make decisions about what additional information is most likely to be useful in identifying the unknown word. Rather than having a one-to-one correspondence between response options and subsequent questions, each response option is associated with a number of potential follow-up questions. The query engine 102 analyzes the available follow-up questions to determine which question is likely to lead to a solution set based on some criteria such as requiring the fewest number of additional questions. Similarly, by having a one-to-many relationship between a question and response options for that question options, a dynamic set of response options for each question is available responses. The query engine analyzes the available response options to the selected question and selects the response options that are presented to the user based on criteria such as the number of probable words eliminated by the selection of each response option.

Thus, where the comparison library is filtered with the current list of definitional characteristics. The query engine applies available definitional characteristics in a predictive filter to analyze the effect (i.e., the number of records eliminated). The query engine then selects those questions and/or responses that are likely to directly contribute to the identification of the unknown word or lead to a question that is likely to be useful in the identification of the unknown word for a particular question.

In the event that the unknown word does not appear in the list of probable words and definitions presented to the user, the user has the option of leaving feedback and/or suggesting a word for entry. Where the additional information described above has been stored and provides a session history, the feedback is associated with the session history for analysis at a later time. Obviously, if the word remains unknown, the user cannot actually suggest the word but, by adding additional information about the unknown word, the administrator of the word identification system 100 can research the issue and potentially make corrections to the word identification system 100 either by adding a word or logical path to a word that is already part of the word identification system 100.

The availability of the word identification system 100 to other users is improved with the use of optional features. For example, pictures are optionally used in place of questions and/or response options to allow usage by users who are not familiar with the base language. In this way, the word identification system 100 becomes a tool for learning languages. The word identification system 100 optionally provides spoken pronunciation of the probable words to assist those unfamiliar with the words.

A word identification system has been shown and described. The word identification system provides a query engine with associated data libraries and an interface that allows a user to identify an unknown word by responding to a series of questions that elicit definitional characteristics that pertain to the meaning of the unknown word. The word identification system presents a question and an associated set of response options to the user. As the user responds to the question, definitional characteristics are accumulated. When the accumulated definitional characteristics correspond to the definitional characteristics associated with a probable word or reasonable number of probable words in the data library, the probable word(s) and their definitions are presented to the user to allow identification of the unknown word. The word identification system optionally uses predictive analysis to select questions and/or response options rather than branching algorithms.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicants general inventive concept.

Having thus described the aforementioned invention, what is claimed is:

1. A method for identifying an unknown word using a series of questions and response options presented by a query engine communicating with a display and an input device, and a memory device storing information about words, said method comprising the steps of:

(a) providing a plurality of sets of probable words in the memory device, each of said plurality of sets of probable words comprising one or more definitions and one or more words corresponding to said one or more definitions, each said plurality of sets of probable words associated with a set of word-set definitional characteristics;

(b) selecting an initial question pertaining to words in general;

(c) selecting a set of initial response options corresponding to said initial question, each of said set of initial response options having a definitional characteristic;

(d) presenting said initial question and said set of initial response options on the display;

(e) accepting a response from the input device, said response being a selected one of said set of initial response options, said initial response definitional characteristic beginning a set of response definitional characteristics;

(f) selecting a question based on said response;

(g) selecting a set of response options corresponding to said question, each of said set of response options having a definitional characteristic;

(h) presenting said question and said set of response options on the display;

(i) accepting said response from the input device, said response being a selected one of said set of response options, said response definitional characteristic joining said set of response definitional characteristics;

(j) repeating said step of selecting a question through said step of accepting a response until said set of response definitional characteristics corresponds to said set of word-set definitional characteristics of one of said plurality of sets of probable words;

(k) selecting, from said plurality of sets of probable words, a selected set of probable words for which said set of word group definitional characteristics corresponds to said set of response definitional characteristics; and (l) presenting said selected said of probable words on the display whereby the unknown word is identified.

2. The method of claim 1 wherein said question from said step of selecting a question based on said response pertains to said definitional characteristic of said response.

3. The method of claim 1 wherein each of said plurality of sets of probable words comprises a single definition and a single word corresponding to that definition.

4. A method for identifying an unknown word having a set of definitional characteristics using a series of questions and response options presented by a query engine communicating with a display and an input device, and a memory device storing information about words, said method comprising the steps of:

(a) providing a plurality of sets of probable words in the memory device, each of said plurality of sets of probable words comprising one or more definitions and one or more words corresponding to said one or more definitions, each said plurality of sets of probable words associated with a set of word-set definitional characteristics, at least one of said plurality of sets of probable words having at least one word-set definitional characteristic corresponding to at least one definitional characteristic of the unknown word;

(b) selecting an initial question pertaining to the part of speech of the unknown word;

(c) selecting a set of initial response options corresponding to said initial question, each of said set of initial response options having a definitional characteristic;

(d) presenting said initial question and said set of initial response options on the display;

(e) accepting a response from the input device, said response being a selected one of said set of initial response options, said initial response definitional characteristic beginning a set of response definitional characteristics;

(f) selecting a question based on said response;

(g) selecting a set of response options corresponding to said question, each of said set of response options having a definitional characteristic corresponding to at least one word-set definitional characteristic of at least one of said plurality of sets of probable words;

(h) presenting said question and said set of response options on the display;

(i) accepting said response from the input device, said response being a selected one of said set of response options, said response definitional characteristic joining said set of response definitional characteristics;

(j) repeating said step of selecting a question through said step of accepting a response until said set of response definitional characteristics corresponds to said set of word-set definitional characteristics of one of said plurality of sets of probable words;

(k) selecting, from said plurality of sets of probable words, a selected set of probable words for which said set of word group definitional characteristics most closely corresponds to said set of response definitional characteristics; and (l) presenting said selected said of probable words on the display whereby the unknown word is identified.

* * * * *